(12) United States Patent
Nagasaka et al.

(10) Patent No.: US 9,378,759 B2
(45) Date of Patent: Jun. 28, 2016

(54) SPIN TORQUE OSCILLATOR WITH LOW MAGNETIC MOMENT AND HIGH PERPENDICULAR MAGNETIC ANISOTROPY MATERIAL

(71) Applicant: HGST Netherlands B.V., Amsterdam (NL)

(72) Inventors: Keiichi Nagasaka, Isehara (JP); Yo Sato, Odawara (JP); Masashige Sato, Atsugi (JP); Susumu Okamura, Fujisawa (JP); Masato Shiimoto, Odawara (JP); Masukazu Igarashi, Kawagoe (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/548,853

(22) Filed: Nov. 20, 2014

(65) Prior Publication Data

US 2016/0148627 A1    May 26, 2016

(51) Int. Cl.
*G11B 5/31*    (2006.01)
*G11B 5/35*    (2006.01)
*G11B 5/00*    (2006.01)

(52) U.S. Cl.
CPC .......... *G11B 5/35* (2013.01); *G11B 2005/0024* (2013.01)

(58) Field of Classification Search
CPC .......... G11B 2005/0024; G11B 5/314; G11B 5/1278; G11B 5/3146; G11B 2005/0005; G11B 5/3133; G11B 5/35

USPC .................................. 360/75, 125.3, 128
See application file for complete search history.

(56) References Cited

U.S. PATENT DOCUMENTS

| | | | |
|---|---|---|---|
| 8,208,219 B2 | 6/2012 | Zhang et al. | |
| 8,274,811 B2 | 9/2012 | Zhang et al. | |
| 8,300,356 B2 | 10/2012 | Zhang et al. | |
| 8,305,711 B2 | 11/2012 | Li et al. | |
| 8,488,373 B2 | 7/2013 | Zhang et al. | |
| 8,687,319 B2 | 4/2014 | Igarashi et al. | |
| 2009/0080106 A1* | 3/2009 | Shimizu et al. | 360/75 |
| 2011/0293967 A1 | 12/2011 | Zhang et al. | |
| 2012/0126905 A1* | 5/2012 | Zhang | G11B 5/3146 331/94.1 |
| 2012/0154952 A1* | 6/2012 | Yamada et al. | 360/125.12 |
| 2014/0036387 A1* | 2/2014 | Sato et al. | 360/78.04 |
| 2014/0071560 A1 | 3/2014 | Chen et al. | |
| 2014/0133048 A1* | 5/2014 | Shiimoto et al. | 360/75 |

* cited by examiner

*Primary Examiner* — Will J Klimowicz
(74) *Attorney, Agent, or Firm* — Patterson & Sheridan, LLP

(57) ABSTRACT

Embodiments disclosed herein generally relate to a magnetic disk device employing a MAMR head. The MAMR head includes an STO. The STO comprises an underlayer, an SPL, an interlayer, an FGL, and a capping layer. The SPL is comprised of a high perpendicular magnetic anisotropy material. The SPL has a large effective perpendicular magnetic anisotropy field, and the SPL has a lower magnetic moment than the FGL. An applied current is adapted to flow in a direction from the FGL to the SPL resulting in the magnetization direction of the SPL being almost perpendicular to the FGL and antiparallel to a head-gap magnetic field due to a relation between a first spin torque directed from the SPL to the FGL and a second spin torque directed from the FGL to the SPL.

23 Claims, 4 Drawing Sheets

SPIN TORQUE OSCILLATOR WITH LOW MAGNETIC MOMENT AND HIGH PERPENDICULAR MAGNETIC ANISOTROPY MATERIAL

BACKGROUND

1. Field

Embodiments disclosed herein generally relate to a magnetic disk device employing a microwave assisted magnetic recording (MAMR) head.

2. Description of the Related Art

Over the past few years, MAMR has been studied as a recording method to improve the areal density of a magnetic read/write device, such as a hard disk drive (HDD). MAMR enabled magnetic recording heads utilize a spin torque oscillator (STO) for generating a microwave (high frequency AC magnetic field). When the magnetic field from the write head is applied and current is conducted to the STO, the STO oscillates and may provide an AC magnetic field to the medium. The AC magnetic field may reduce the coercive force of the recording medium, thus high quality recording by MAMR may be achieved. Typically the STO includes a spin polarization layer (SPL), a field generation layer (FGL) and an interlayer disposed between the SPL and the FGL. The STO generates high frequency magnetic fields, or microwaves, as a result of the transfer of spin torque from the SPL through the interlayer to the FGL, and the in-plane high speed rotation of the magnetization of the FGL serves as the in-plane free layer.

In some designs, the magnetization direction in the SPL is perpendicular to the magnetization direction in the FGL, also known as the T-mode oscillation mode. The T-mode oscillation utilizes reflect torque, which has low efficiency. In the T-mode oscillation, the head-gap field is parallel to the magnetization direction of the SPL. In other designs, the magnetization direction in the SPL is anti-parallel to the magnetization direction in the FGL, also known as the AF-mode oscillation mode. Anti-parallel means that the magnetization directions in the SPL and the FGL are parallel but in opposite directions. In AF-mode oscillation, both the current and the head-gap field are perpendicular to the magnetization direction of the SPL. AF-mode oscillation utilizes both reflect torque and direct torque so oscillation with small bias current can be obtained. However, anti-parallel magnetization directions may partially cancel the magnetizations in the SPL and FGL, leading to weak AC magnetic field and unstable magnetization oscillation behavior.

Therefore, there is a need in the art for an improved recording head for MAMR having an STO with high efficiency and a stable oscillation state.

SUMMARY

Embodiments disclosed herein generally relate to a magnetic disk device employing a MAMR head. The MAMR head includes an STO. The STO comprises an underlayer, an SPL, an interlayer, an FGL, and a capping layer. The SPL is comprised of a high perpendicular magnetic anisotropy material. The SPL has a large effective perpendicular magnetic anisotropy field, and the SPL has a lower magnetic moment than the FGL. An applied current is adapted to flow in a direction from the FGL to the SPL resulting in the magnetization direction of the SPL being anti-parallel to a head-gap magnetic field due to a relation between a first spin torque directed from the SPL to the FGL and a second spin torque directed from the FGL to SPL.

In one embodiment, a spin torque oscillator comprises an underlayer, a spin polarization layer, an interlayer, a field generation layer, and a capping layer. An applied current is adapted to flow in a direction from the field generation layer to the spin polarization layer. The current applied to a coil affects the direction of the head-gap field. A magnetization direction of the spin polarization layer is anti-parallel to the direction of the head-gap field in an oscillation mode due to a relation between a first spin torque directed from the spin polarization layer to the field generation layer and a second spin torque directed from the field generation layer to the spin polarization layer.

In another embodiment, a magnetic head comprises a main pole, a trailing shield, and a spin torque oscillator disposed between the main pole and the trailing shield. The spin torque oscillator further comprises an underlayer, a spin polarization layer, an interlayer disposed on the spin polarization layer, a field generation layer disposed on the interlayer, and a capping layer. An applied current is adapted to flow in a direction from the field generation layer to the spin polarization layer and current applied to the coil results in a magnetization direction of the spin polarization layer being anti-parallel to a head-gap field, due to a relation between a first spin torque directed from the spin polarization layer to the field generation layer and a second spin torque directed from the field generation layer to the spin polarization layer.

In another embodiment, a magnetic recording device comprises a magnetic medium, a magnetic write head coupled to the magnetic read head, the magnetic write head including a main pole and a trailing shield, and a spin torque oscillator disposed between the main pole and the trailing shield. The spin torque oscillator further comprises an underlayer, a spin polarization layer, an interlayer disposed on the spin polarization layer, a field generation layer disposed on the interlayer, and a capping layer. An applied current is adapted to flow in a direction from the field generation layer to the spin polarization layer, and current applied to the coil results in a magnetization direction of the spin polarization layer being anti-parallel to a head-gap field, due to a relation between a first spin torque directed from the spin polarization layer to the field generation layer and a second spin torque directed from the field generation layer to the spin polarization layer.

BRIEF DESCRIPTION OF THE DRAWINGS

So that the manner in which the above recited features can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s).

Embodiments disclosed herein generally relate to a magnetic disk device employing a MAMR head. The MAMR head includes an STO. The STO comprises an underlayer, an SPL, an interlayer, an FGL, and a capping layer. The SPL is comprised of a high perpendicular magnetic anisotropy material. The SPL has a large effective perpendicular magnetic anisotropy field, and the SPL has a lower magnetic moment than the FGL. An applied current is adapted to flow in a direction from the FGL to the SPL and a current applied to the coil results in the magnetization direction of the SPL being anti-parallel to the head-gap magnetic field due to a relation between a first spin torque directed from the SPL to the FGL and a second spin torque directed from the FGL to the SPL.

Figure 1:
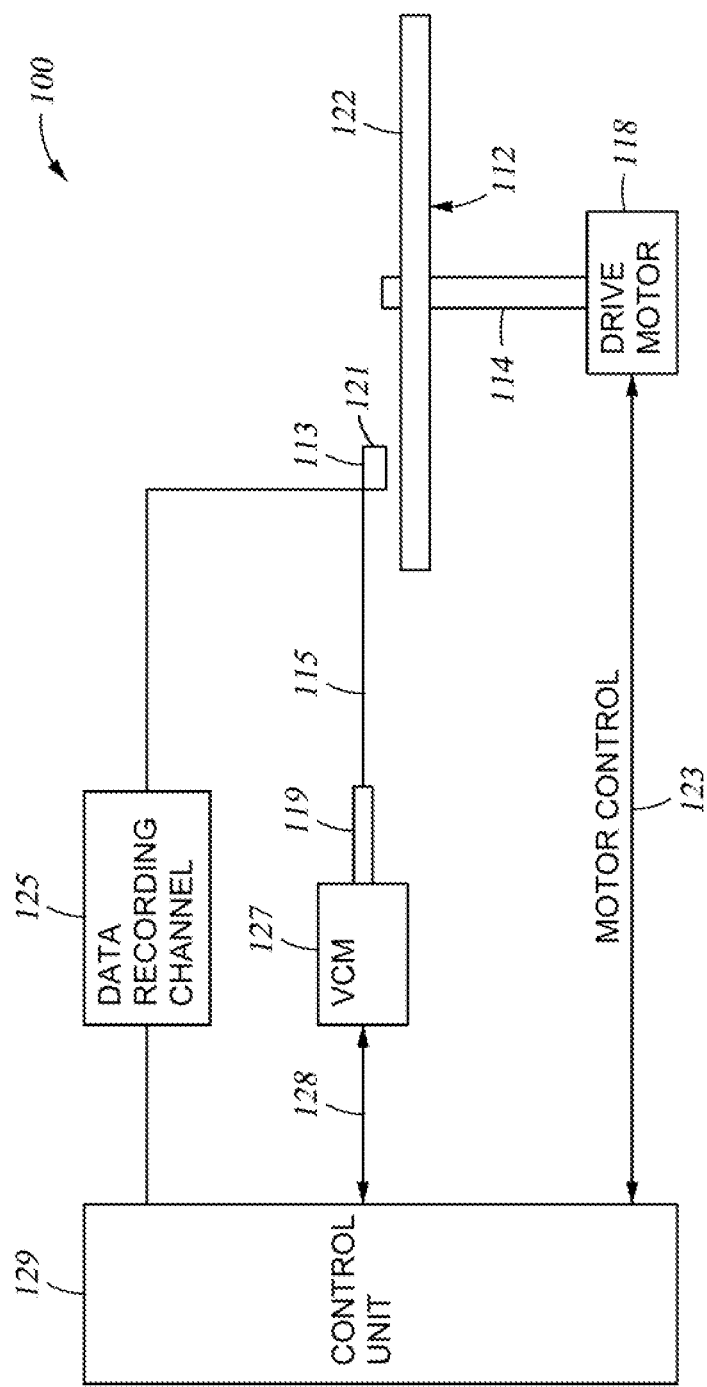
FIG. 1 illustrates a disk drive system, according to embodiments described herein.

FIG. 1 illustrates a disk drive 100 according to embodiments described herein. As shown, at least one rotatable magnetic media, such as a magnetic disk 112, is supported on a spindle 114 and rotated by a disk drive motor 118. Typically, the magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include an STO for applying an AC magnetic field to the disk surface 122. As the magnetic disk rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the MAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the medium.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
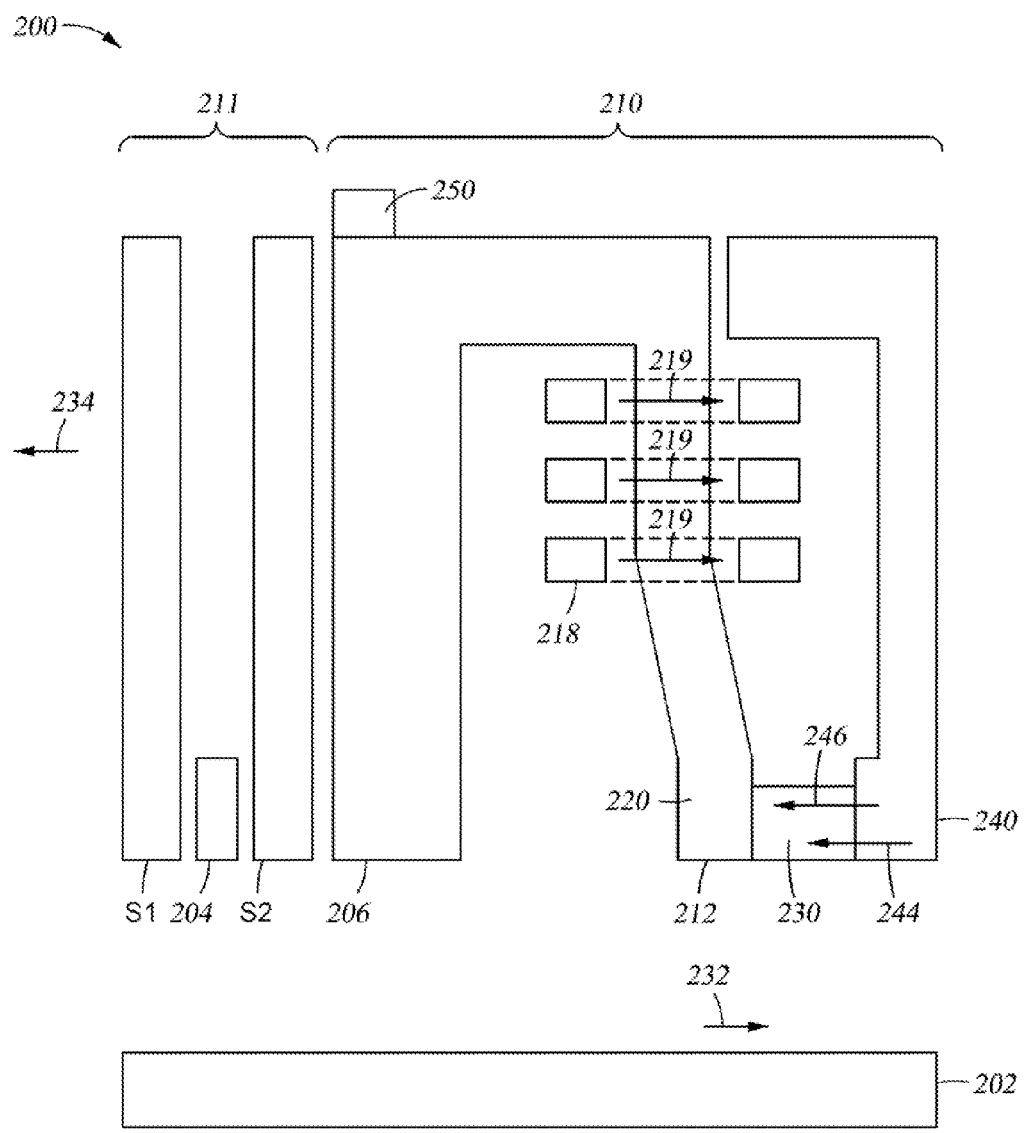
FIG. 2 is a cross sectional view of a MAMR read/write head and magnetic disk of the disk drive system of FIG. 1, according to embodiments described herein.

FIG. 2 is a fragmented, cross sectional side view through the center of a MAMR read/write head 200 facing a magnetic disk 202. The read/write head 200 and magnetic disk 202 may correspond to the magnetic head assembly 121 and magnetic disk 112, respectively in FIG. 1. The read/write head 200 includes an air bearing surface (ABS) 212, such as a media facing surface (MFS), a magnetic write head 210 and a magnetic read head 211, and is mounted such that the ABS 212 is facing the magnetic disk 202. In FIG. 2, the disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between magnetic shields S1 and S2. In other embodiments, the magnetic read head 211 is a magnetic tunnel junction (MTJ) read head that includes an MTJ sensing device 204 located between magnetic shields S1 and S2. The magnetic fields of the adjacent magnetized regions in the magnetic disk 202 are detectable by the MR (or MTJ) sensing element 204 as the recorded bits.

The write head 210 includes a return pole 206, a main pole 220, a trailing shield 240, an STO 230 disposed between the main pole 220 and the trailing shield 240, and a coil 218 that excites the main pole 220. An alternating current may be applied to the coil 218 during recording, as shown by arrow 219, and a current may be applied to the STO 230, as shown by arrow 244. The current 244 applied to the STO 230 may be applied by a separate power supply (not shown), such as a direct current power supply. The alternating current 219 applied to the coil 218 results in a head-gap field 246. The head-gap field 246 switches direction as the current 219 applied to the coil 218 alternates. A recording magnetic field is generated from the main pole 220 and the trailing shield 240 helps make the magnetic field gradient of the main pole 220 steep. The main pole 220 may be a magnetic material such as a CoFe alloy. In one embodiment, the main pole 220 has a saturated magnetization (Ms) of 2.4 T and a thickness of about 300 nanometers (nm). The trailing shield 240 may be a magnetic material such as NiFe alloy or CoFe alloy. In one embodiment, the trailing shield 240 has an Ms of about 1.2 T.

The main pole 220, the trailing shield 240 and the STO 230 all extend to the ABS 212, and the STO 230 disposed between the main pole 220 and the trailing shield 240 is electrically coupled to the main pole 220 and the trailing shield 240. The STO 230 may be surrounded by an insulating material (not shown) in a cross-track direction (into and out of the paper). During operation, the STO 230 generates an AC magnetic field that travels to the magnetic disk 202 to lower the coercivity of the region of the magnetic disk 202 adjacent to the STO 230. The write head 210 further includes a heater 250 for adjusting the distance between the read/write head 200 and the magnetic disk 202. The location of the heater 250 is not limited to above the return pole 206, as shown in FIG. 2. The heater 250 may be disposed at any suitable location.

Figure 3A:
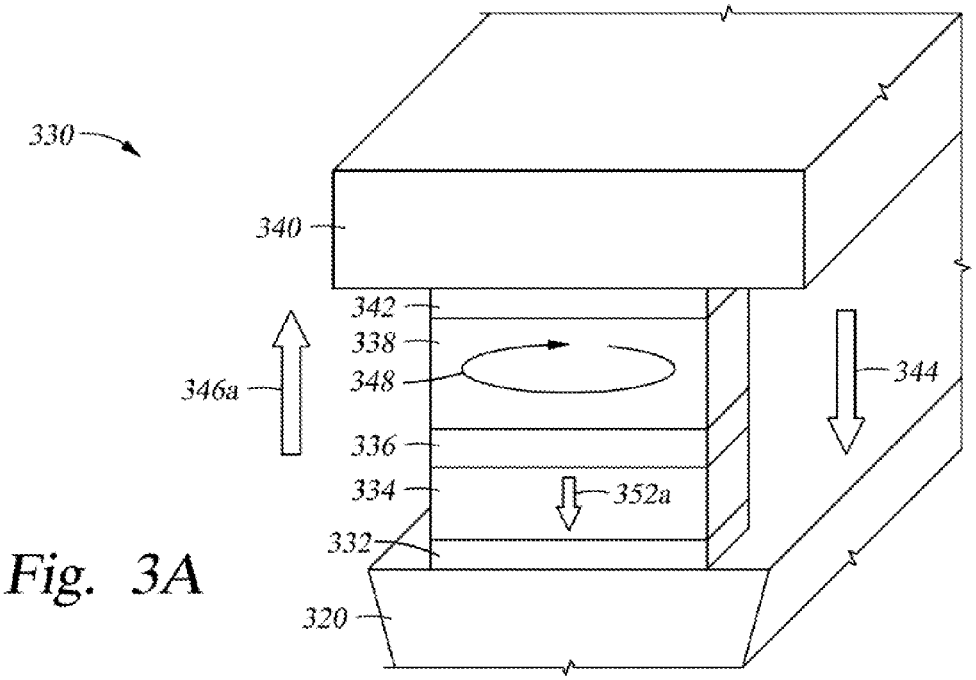
FIGS. 3A-3B illustrate an air bearing surface view of an STO, according to one embodiment.

FIG. 3A illustrates an STO 330 disposed between a main pole 320 and a trailing shield 340 viewed from the ABS, according to one embodiment. The STO 330 may be the STO 230 shown in FIG. 2. The STO 330 comprises an underlayer 332 disposed on the main pole 320, an SPL 334, or a perpendicular magnetic anisotropy layer, disposed on the underlayer 332, an interlayer 336 disposed on the SPL 334, an FGL 338, or in-plane magnetic anisotropy layer, disposed on the interlayer 336, and a capping layer 342 disposed between the FGL 338 and the trailing shield 340. In one embodiment, the capping layer 342 is disposed under the trailing shield 340. A head gap field 346a is applied in a direction from the main pole 320 to the trailing shield 340 in one state of high frequency recording. The head-gap field 346a is the field created by the coil 218. A current 344 is applied to the STO 330, causing the STO 330 to oscillate. The applied current 344 may be adapted to flow in the direction from the FGL 338 to the SPL 334. The current 344 may be the current 244 applied to the STO 230 shown in FIG. 2. The SPL 334 has a lower magnetic moment than the FGL 338. When the STO 330 is in an oscillation mode, the FGL 338 has a magnetization almost in-plane as shown by arrow 348, and the SPL 334 has a magnetization perpendicular to the film plane. In the embodiment shown in FIG. 3A, the SPL magnetization is in the same direction as the current 344, or in an anti-parallel direction to the head-gap field 346a, as shown by arrow 352a. The magnetization direction 352a of the SPL 334 is anti-parallel to the head-gap magnetic field 346a, due to a relation between a first spin torque directed from the SPL 334 to the FGL 338 and a second spin torque directed from the FGL 338 to the SPL 334. The first spin torque directed from the SPL 334 to the FGL 338 is a direct torque, having high spin torque efficiency. The second torque directed from the FGL 338 to the SPL 334 is a reflect torque, having low spin torque efficiency. The current 219 applied to the coil 218 alternates such that the head gap field 346a alternates. The magnetization directions of the FGL 338 and the SPL 334 are almost perpendicular due to the relation of the magnetic moments and spin torque valance between the FGL 338 and the SPL 334. Since the magnetization direction 352a of the SPL 334 is anti-parallel to the head-gap field 346a in oscillation, the oscillation mode of the STO 330 is referred to as a reverse T-mode oscillation.

The lower magnetic moment of the SPL 334 relative to the FGL 338 in combination with the reflected torque from the FGL 338 further results in the magnetization direction 352a of the SPL 334 being anti-parallel to the head-gap field 346a. The STO 330 also generates a direct spin-torque in the direction from the SPL 334 to the FLG 338 to cause oscillations. Since the STO 330 utilizes both reflect torque and direct torque, high efficiency and a stable oscillation state with small bias current are obtained. Additionally, the effective perpendicular magnetic anisotropy field of the SPL 334 is larger than the effective demagnetization field of the SPL 334. The large effective perpendicular magnetic anisotropy field results in a stable SPL 334. In one embodiment, the effective perpendicular magnetic anisotropy field of the SPL 334 is greater than 10 kOe. In another embodiment, the SPL 334 has a magnetic moment lower than about 1 T, and the FGL 338 has a higher magnetic moment than about 1 T. The magnetic moment volume ratio between the SPL 334 and the FGL 338 may be equal to or less than two, and preferably, the magnetic moment volume ratio between the SPL 334 and the FGL 338 is equal to or less than three.

Figure 3B:
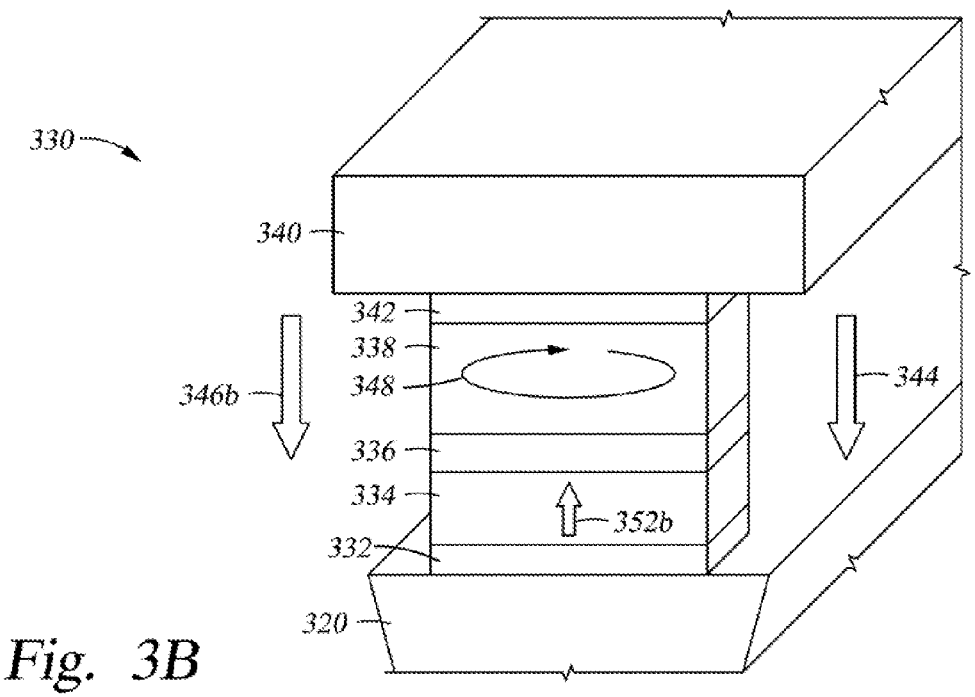

FIG. 3B illustrates the STO 330 when the current 219 is applied to the coil 218 of FIG. 2 is reversed when the write head 210 is in another state of another state of high frequency recording. Applying an alternating current 219 to the coil 218 alternately changes the recording sequence for excitation of the main pole 320. The alternating current 219 applied to the coil 218 reverses the direction of the head-gap field 346a. The head-gap field 346b reversing direction causes the magnetization direction 352b of the SPL 334 to reverse. When the alternating current 219 switches the direction of the head-gap field 346b, the head-gap field 346b is parallel with the applied current 344, and the magnetization direction 352b of the SPL 334 is anti-parallel to both the current 344 and the head-gap field 346b. When the write head 210 is recording, the STO 330 alternates between the states of FIG. 3A and FIG. 3B.

The head gap field 346b is applied in a direction from the trailing shield 340 to the main pole 320 in one state of high frequency recording. The current 344 remains flowing in a direction from the FGL 338 to the SPL 334, causing the STO 330 to oscillate. The SPL 334 has a lower magnetic moment than the FGL 338. When the STO 330 is in an oscillation mode, the FGL 338 has a magnetization almost in-plane shown by the arrow 348, and the SPL 334 has a magnetization perpendicular to the film plane and anti-parallel to the flow of the current 344, or in an anti-parallel direction to the head-gap field 346b, as shown by arrow 352b. The magnetization directions of the FGL 338 and the SPL 334 are due to the relation of the magnetic moments and spin torque valance between the FGL 338 and the SPL 334. Since the magnetization direction 352b of the SPL 334 is perpendicular to the FGL 338 and anti-parallel to the head-gap field 346b, the oscillation mode of the STO 330 is a reverse T-mode oscillation.

The reverse T-mode oscillation mode of the STO 330 differs from other oscillation modes in a number of ways. In the normal T-mode oscillation, the magnetization direction of the SPL is parallel to the head-gap field and has a current which flows from the SPL to the FGL. In the AF-mode oscillation, the SPL and the FGL have magnetization directions that are in-plane but almost anti-parallel to one another. The normal T-mode oscillation has low spin torque efficiency and requires a large bias current to the STO in order to function as desired. The AF-mode oscillation may have a low effective perpendicular magnetic anisotropy field of the SPL, or the effective perpendicular magnetic anisotropy field of the SPL may be zero. Thus, the AF-mode oscillation has an unstable magnetization of the SPL and an unstable oscillation state. The reverse T-mode oscillation STO 330 has high spin torque efficiency, a stable oscillation state, a high effective perpendicular magnetic anisotropy field of the SPL, and a stable SPL. Further, the reverse T-mode oscillation results in the SPL having a lower magnetic moment than in both the normal T-mode oscillation and the AF-mode oscillation. The reverse T-mode oscillation may also reduce the drive-voltage of the STO 330, and may result in a more reliable device over a long term device operation.

The SPL 334 comprises a high perpendicular magnetic anisotropy (PMA) material. A PMA material may be a magnetic alloy structure containing Co, Ni, or Fe, such as CoFe, CoIr, CoCr, CoCrPt, CoPt, or FePt. A PMA material may also include a magnetic multilayer structure of Co, Ni, Fe and their respective alloys with a non-magnetic material, such as Pd, Pt, Ir, Rh, or Cu. An example of these structures may be [Co/Pd]n, [Co/Pt]n, [Ni/Pd]n, [FeCo/Pd]n, [CoNi/Pd]n, [Fe/Pt]n, and [Co/Ni]n, where n is an integer between 2 and 6, or an equivalent combination thereof. Further, a PMA material may be selected from the rare earth magnetic materials. For example, one material could be chosen from the group Fe, Co, and FeCo and combined with one from the group Gd, Tb, Dy, Ho, and Er, resulting in a PMA material such as TbCo or TbFeCo. The FGL 338 may comprise Co, Ni, Fe and their respective alloys including a Heusler material, such as CoMnGe, CoMnGa, or CoFeGe. The interlayer 336 may comprise Cu, Cr, Ag, and their respective alloys. The underlayer 332 may comprise Ta, Cu, Pt, or Ru. The capping layer 342 may comprise Cr, Ru, or Cu.

Figure 4A:
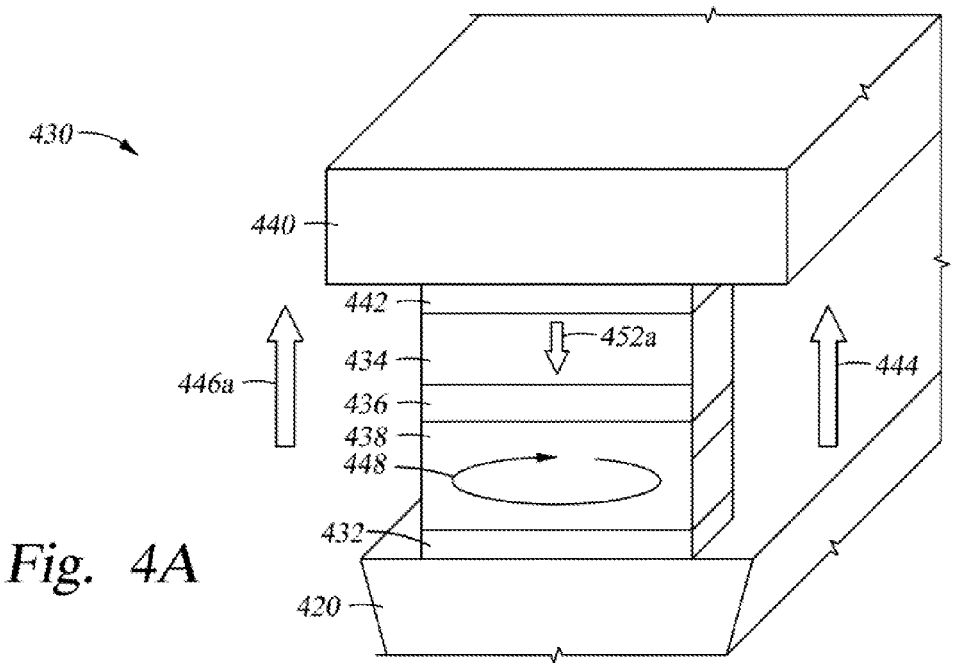
FIGS. 4A-4B illustrate an air bearing surface view of an STO, according to another embodiment.

FIG. 4A illustrates an STO 430 disposed between a main pole 420 and a trailing shield 440 viewed from the ABS, according to another embodiment. The STO 430 differs from the STO 330 in that the placement of the SPL 434 and the FGL 438 are switched. The STO 430 may be the STO 230 shown in FIG. 2. The STO 430 comprises an underlayer 432 disposed on the main pole 420, an FGL 438 disposed on the underlayer 432, an interlayer 436 disposed on the FGL 438, an SPL 434 disposed on the interlayer 436, and a capping layer 442 disposed between the SPL 434 and the trailing shield 440. In one embodiment, the capping layer 442 is disposed under the trailing shield 440. A head-gap field 446a is applied in a direction from the main pole 420 to the trailing shield 440 in one state of high frequency recording. The head-gap field 446a is the field created by the coil 218. A current 444 is applied to the STO 430, causing the STO 430 to oscillate. The applied current 444 may be adapted to flow in the direction from the FGL 438 to the SPL 434. The current 444 may be the current 244 applied to the STO 230 shown in FIG. 2. The FGL 438 has a magnetization almost in-plane shown by the arrow 448, and the SPL 434 has a magnetization perpendicular to the film plane. In the embodiment shown in FIG. 4A, the SPL magnetization is in an anti-parallel direction to both the head-gap field 446a and the current 444, as shown by arrow 452a. The current 219 applied to the coil 218 alternates the direction of the head-gap field 446a, leading to an alternation of the SPL magnetization direction 452a. The magnetization directions of the FGL 438 and the SPL 434 are almost perpendicular due to the relation of the magnetic moments and spin torque valance between the FGL 438 and the SPL 434. Since the magnetization direction 452a of the SPL 434 becomes almost perpendicular to the FGL 438 and anti-parallel to the head-gap field 446a, the oscillation mode of the STO 430 is a reverse T-mode oscillation.

Figure 4B:
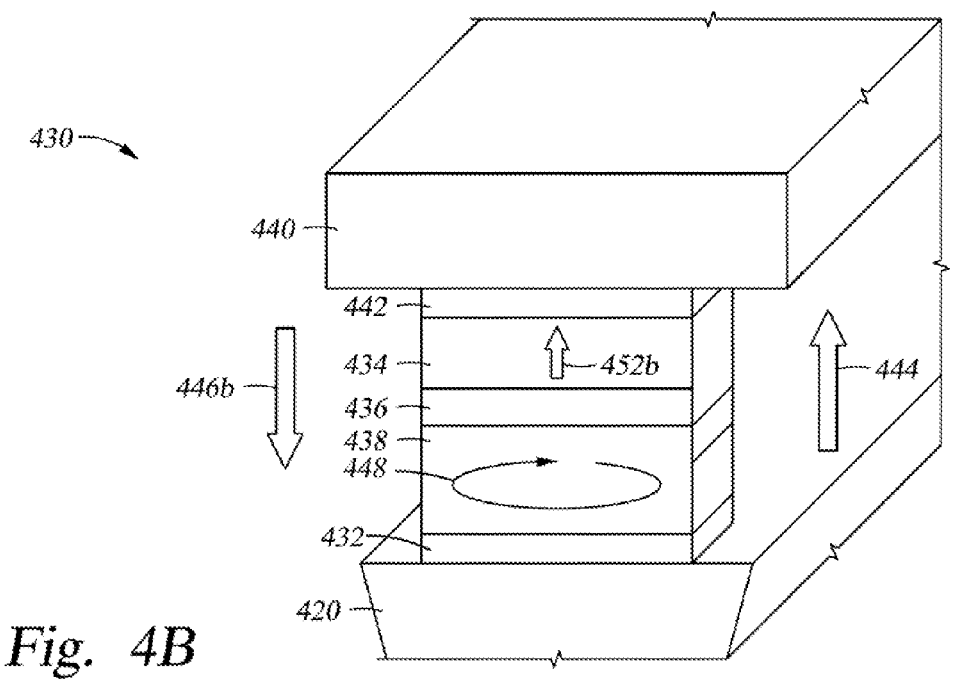

FIG. 4B illustrates the STO 430 when the current is applied to the coil 218 of FIG. 2 is reversed when the write head 210 is in another state of high frequency recording. Applying an alternating current 219 to the coil 218 alternately changes the recording sequence for write-pole excitation. The alternating current 219 applied to the coil 218 reverses the direction of the head-gap field 446a. The head-gap field 446b reversing direction causes the magnetization direction 452b of the SPL 434 to reverse due to a relation between the first spin torque directed from the SPL 434 to the FGL 438 and the second spin torque directed from the FGL 438 to the SPL 434. The first spin torque directed from the SPL 434 to the FGL 438 is a direct torque, having high spin torque efficiency. The second torque directed from the FGL 438 to the SPL 434 is a reflect torque, having low spin torque efficiency. When the alternating current 219 switches the direction of the head-gap field 446b, the head-gap field 446b is anti-parallel with the applied current 444, and sequentially, the magnetization direction 452b of the SPL 434 is anti-parallel to both the current 444 and the head-gap field 446b. When the write head 210 is recording, the STO 430 alternates between the states of FIG. 4A and FIG. 4B.

The head gap field 446b is applied in a direction from the trailing shield 440 to the main pole 420 in one state of high frequency recording. A current 444 is applied to flow in the direction from the FGL 438 to the SPL 434, causing the STO 430 to oscillate. The FGL 438 has a magnetization almost in-plane shown by arrow 448, and the SPL 434 has a magnetization perpendicular to the film plane and parallel to the flow of the current 444, or in an anti-parallel direction to the head-gap field 446b, as shown by arrow 452b. Since the magnetization direction 452b of the SPL 434 is anti-parallel to the head-gap field 446b due to the relation between the first spin torque directed from the SPL 434 to the FGL 438 and the second spin torque directed from the FGL 438 to the SPL 434, the oscillation mode of the STO 430 is a reverse T-mode oscillation.

The reverse T-mode oscillation of the STO embodiments described herein result in an overall improved recording head for MAMR. The anti-parallel direction of the magnetization of the SPL to the head-gap field leads to an STO which is successful in obtaining high spin torque efficiency, a stable oscillation state with a small bias current, and a stable magnetization of the SPL. The anti-parallel direction of the magnetization of the SPL to the head-gap field results in the STO obtaining high spin torque efficiency because the direct spin torque between the FGL and the SPL assists in oscillation.

While the foregoing is directed to exemplary embodiments, other and further embodiments of the disclosure may be devised without departing from the basic scope thereof, and the scope thereof is determined by the claims that follow.

What is claimed is:

1. A spin torque oscillator, comprising:
   an underlayer;
   a spin polarization layer comprised of a high perpendicular magnetic anisotropy material, the spin polarization layer having a large effective perpendicular magnetic anisotropy field;
   an interlayer;
   a field generation layer; and
   a capping layer;
   wherein a coil is adapted to generate a head-gap field; and
   wherein a power supply is adapted to apply a current to flow in a direction from the field generation layer to the spin polarization layer resulting in a magnetization direction of the spin polarization layer anti-parallel to the head-gap field, and wherein the spin polarization layer has a lower magnetic moment than the field generation layer, wherein the spin polarization layer has a magnetic moment lower than about 1 T and the field generation layer has a magnetic moment greater than about 1 T.

2. The spin torque oscillator of claim 1, wherein the spin polarization layer is disposed on the underlayer, the interlayer is disposed on the spin polarization layer, the field generation layer is disposed on the interlayer, and the capping layer is disposed between the field generation layer and a trailing shield.

3. The spin torque oscillator of claim 1, wherein the field generation layer is disposed on the underlayer, the interlayer is disposed on the field generation layer, the spin polarization layer is disposed on the interlayer, and the capping layer is disposed between the spin polarization layer and a trailing shield.

4. A spin torque oscillator, comprising:
   an underlayer;

a spin polarization layer comprised of a high perpendicular magnetic anisotropy material, the spin polarization layer having a large effective perpendicular magnetic anisotropy field;
an interlayer;
a field generation layer; and
a capping layer;
wherein a coil is adapted to generate a head-gap field; and
wherein a power supply is adapted to apply a current to flow in a direction from the field generation layer to the spin polarization layer resulting in a magnetization direction of the spin polarization layer anti-parallel to the head-gap field, and wherein the spin polarization layer has a lower magnetic moment than the field generation layer, wherein an effective perpendicular magnetic anisotropy field of the spin polarization layer is greater than 10 kOe.

5. The spin torque oscillator of claim 4, wherein the high perpendicular magnetic anisotropy material comprising the spin torque oscillator is a magnetic alloy structure containing Co, Ni, or Fe.

6. The spin torque oscillator of claim 4, wherein the high perpendicular magnetic anisotropy material comprising the spin torque oscillator is a magnetic multilayer structure selected from the group consisting of Co, Ni and Fe and their respective alloys with a non-magnetic material selected from the group consisting of Pd, Pt, Ir, Rh and Cu.

7. The spin torque oscillator of claim 6, wherein the high perpendicular magnetic anisotropy material comprising the spin torque oscillator is [Co/Pd]n, [Co/Pt]n, [Ni/Pd]n, [FeCo/Pd]n, [CoNi/Pd]n, [Fe/Pt]n, or [Co/Ni]n, where n is an integer from 2 to 6.

8. A spin torque oscillator, comprising:
an underlayer;
a spin polarization layer comprised of a high perpendicular magnetic anisotropy material, the spin polarization layer having a large effective perpendicular magnetic anisotropy field;
an interlayer;
a field generation layer; and
a capping layer;
wherein a coil is adapted to generate a head-gap field; and
wherein a power supply is adapted to apply a current to flow in a direction from the field generation layer to the spin polarization layer resulting in a magnetization direction of the spin polarization layer anti-parallel to the head-gap field, and wherein the spin polarization layer has a lower magnetic moment than the field generation layer, wherein the high perpendicular magnetic anisotropy material comprising the spin torque oscillator is one material selected from the group consisting of Fe, Co and FeCo combined with one material selected from the group consisting of Gd, Tb, Dy, Ho, and Er.

9. A magnetic head, comprising:
a main pole;
a coil adapted to excite the main pole, wherein the coil is adapted to generate a head-gap field;
a trailing shield; and
a spin torque oscillator disposed between the main pole and the trailing shield, comprising:
an underlayer disposed on the main pole;
a field generation layer;
an interlayer;
a spin polarization layer disposed on the interlayer, wherein the spin polarization layer is comprised of a high perpendicular magnetic anisotropy material, and wherein the spin polarization layer has a large effective perpendicular magnetic anisotropy field; and
a capping layer disposed under the trailing shield;
wherein a power supply is adapted to apply a current to the spin torque oscillator, wherein the current is adapted to flow in a direction from the field generation layer to the spin polarization layer resulting in a magnetization direction of the spin polarization layer anti-parallel to the head-gap field, and wherein the spin polarization layer has a lower magnetic moment than the field generation layer, wherein the spin polarization layer has a magnetic moment lower than about 1 T and the field generation layer has a magnetic moment greater than about 1 T.

10. The magnetic head of claim 9, wherein the power supply is adapted to apply a current to the coil to reverse the direction of the head-gap field.

11. The magnetic head of claim 9, wherein the spin polarization layer is disposed on the underlayer, the interlayer is disposed on the spin polarization layer, the field generation layer is disposed on the interlayer, and the capping layer is disposed between the field generation layer and the trailing shield.

12. The magnetic head of claim 9, wherein the field generation layer is disposed on the underlayer, the interlayer is disposed on the field generation layer, the spin polarization layer is disposed on the interlayer, and the capping layer is disposed between the spin polarization layer and the trailing shield.

13. The magnetic head of claim 9, wherein the high perpendicular magnetic anisotropy material comprising the spin torque oscillator is a magnetic multilayer structure selected from the group consisting of Co, Ni and Fe and their respective alloys with a non-magnetic material selected from the group consisting of Pd, Pt, Ir, Rh and Cu.

14. The magnetic head of claim 13, wherein the high perpendicular magnetic anisotropy material comprising the spin torque oscillator is [Co/Pd]n, [Co/Pt]n, [Ni/Pd]n, [FeCo/Pd]n, [CoNi/Pd]n, [Fe/Pt]n, or [Co/Ni]n, where n is an integer from 2 to 6.

15. The magnetic head of claim 9, wherein the high perpendicular magnetic anisotropy material comprises CoFe, Coir, CoCr, CoCrPt, CoPt, or FePt.

16. A magnetic head, comprising:
a main pole;
a coil adapted to excite the main pole, wherein the coil is adapted to generate a head-gap field;
a trailing shield; and
a spin torque oscillator disposed between the main pole and the trailing shield, comprising:
an underlayer disposed on the main pole;
a field generation layer;
an interlayer;
a spin polarization layer disposed on the interlayer, wherein the spin polarization layer is comprised of a high perpendicular magnetic anisotropy material, and wherein the spin polarization layer has a large effective perpendicular magnetic anisotropy field; and
a capping layer disposed under the trailing shield;
wherein a power supply is adapted to apply a current to the spin torque oscillator, wherein the current is adapted to flow in a direction from the field generation layer to the spin polarization layer resulting in a magnetization direction of the spin polarization layer anti-parallel to the head-gap field, and wherein the spin polarization layer has a lower magnetic moment than the field generation layer, wherein the high perpendicular magnetic anisotropy material comprising the spin torque oscillator is one material chosen from the group Fe, Co, and FeCo combined with one material chosen from the group Gd, Tb, Dy, Ho, and Er.

17. A magnetic recording device, comprising:
a magnetic medium;
a magnetic read head disposed opposite the magnetic medium;
a magnetic write head coupled to the magnetic read head, wherein the magnetic write head comprises a main pole and a trailing shield;
a coil adapted to excite the main pole, wherein the coil is adapted to generate a head-gap field;
a spin torque oscillator disposed between the main pole and the trailing shield, comprising:
  an underlayer disposed on the main pole;
  a spin polarization layer comprised of a high perpendicular magnetic anisotropy material, the spin polarization layer having a large effective perpendicular magnetic anisotropy field;
  an interlayer;
  a field generation layer;
  a capping layer disposed under the trailing shield; and
  a power supply;
wherein the power supply is adapted to apply a current to the spin torque oscillator, wherein the current is adapted to flow in a direction from the field generation layer to the spin polarization layer resulting in a magnetization direction of the spin polarization layer anti-parallel to the head-gap field, and wherein the spin polarization layer has a lower magnetic moment than the field generation layer, wherein an effective perpendicular magnetic anisotropy field of the spin polarization layer is greater than 10 kOe.

18. The magnetic recording device of claim 17, wherein the power supply is adapted to apply a current to the coil to reverse the direction of the head-gap field.

19. The magnetic recording device of claim 17, wherein the spin polarization layer is disposed on the underlayer, the interlayer is disposed on the spin polarization layer, the field generation layer is disposed on the interlayer, and the capping layer is disposed between the field generation layer and the trailing shield.

20. The magnetic recording device of claim 17, wherein the field generation layer is disposed on the underlayer, the interlayer is disposed on the field generation layer, the spin polarization layer is disposed on the interlayer, and the capping layer is disposed between the spin polarization layer and the trailing shield.

21. The magnetic recording device 17, wherein the high perpendicular magnetic anisotropy material comprising the spin torque oscillator is a magnetic multilayer structure selected from the group consisting of Co, Ni and Fe and their respective alloys with a non-magnetic material selected from the group consisting of Pd, Pt, Ir, Rh and Cu.

22. The magnetic recording device of claim 21, wherein the high perpendicular magnetic anisotropy material comprising the spin torque oscillator is [Co/Pd]n, [Co/Pt]n, [Ni/Pd]n, [FeCo/Pd]n, [CoNi/Pd]n, [Fe/Pt]n, or [Co/Ni]n, where n is an integer from 2 to 6.

23. A magnetic recording device, comprising:
a magnetic medium;
a magnetic read head disposed opposite the magnetic medium;
a magnetic write head coupled to the magnetic read head, wherein the magnetic write head comprises a main pole and a trailing shield;
a coil adapted to excite the main pole, wherein the coil is adapted to generate a head-gap field;
a spin torque oscillator disposed between the main pole and the trailing shield, comprising:
  an underlayer disposed on the main pole;
  a spin polarization layer comprised of a high perpendicular magnetic anisotropy material, the spin polarization layer having a large effective perpendicular magnetic anisotropy field;
  an interlayer;
  a field generation layer;
  a capping layer disposed under the trailing shield; and
  a power supply;
wherein the power supply is adapted to apply a current to the spin torque oscillator, wherein the current is adapted to flow in a direction from the field generation layer to the spin polarization layer resulting in a magnetization direction of the spin polarization layer anti-parallel to the head-gap field, and wherein the spin polarization layer has a lower magnetic moment than the field generation layer, the high perpendicular magnetic anisotropy material comprising the spin torque oscillator is one material chosen from the group Fe, Co, and FeCo combined with one material chosen from the group Gd, Tb, Dy, Ho, and Er.

* * * * *